(12) United States Patent
Baca et al.

(10) Patent No.: US 10,284,956 B2
(45) Date of Patent: May 7, 2019

(54) TECHNOLOGIES FOR LOCALIZED AUDIO ENHANCEMENT OF A THREE-DIMENSIONAL VIDEO

(71) Applicant: Intel Corporation, Santa Clara, CA (US)

(72) Inventors: Jim S. Baca, Corrales, NM (US); David Stanasolovich, Albuquerque, NM (US); Rajeev C. Puran, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/752,895

(22) Filed: Jun. 27, 2015

(65) Prior Publication Data

US 2016/0381459 A1    Dec. 29, 2016

(51) Int. Cl.
| | |
|---|---|
| *H04N 13/00* | (2018.01) |
| *H04R 5/04* | (2006.01) |
| *H04R 1/40* | (2006.01) |
| *H04R 3/00* | (2006.01) |
| *H04N 13/02* | (2006.01) |
| *H04R 1/02* | (2006.01) |

(52) U.S. Cl.
CPC .......... *H04R 5/04* (2013.01); *H04N 13/0207* (2013.01); *H04N 13/0253* (2013.01); *H04N 13/0271* (2013.01); *H04R 1/406* (2013.01); *H04R 3/005* (2013.01); *H04R 1/028* (2013.01); *H04R 2201/401* (2013.01); *H04R 2203/12* (2013.01); *H04R 2430/20* (2013.01); *H04R 2499/11* (2013.01)

(58) Field of Classification Search
CPC ....................................................... H04N 5/04
USPC ........................................ 348/231.4; 381/92
See application file for complete search history.

(56) References Cited

U.S. PATENT DOCUMENTS

2014/0029761 A1 *  1/2014  Maenpaa  ............... H04R 3/005
                                                         381/92

* cited by examiner

*Primary Examiner* — Joel W Fosselman
(74) *Attorney, Agent, or Firm* — Barnes & Thornburg LLP

(57) ABSTRACT

Technologies for localized audio enhancement of a three-dimensional video include capturing a three-dimensional video including depth data using a three-dimensional camera of a mobile computing device and receiving a three-dimensional audio associated with the three-dimensional video using a microphone array. A user may enhance localized audio by selecting a region of the three-dimensional image from the three-dimensional video. In response, the mobile computing device generates an audio component of the three-dimensional audio corresponding to the selected region based on depth data associated with the selected region. A user may subsequently enhance the audio component by, for example, increasing the volume of the audio component or increasing the clarity of the audio component. In this way, a user may focus the audio playback on a selected portion of the three-dimensional video, which improves the user's ability to listen and understand an individual, group of individuals, or region captured in the three-dimensional video.

19 Claims, 10 Drawing Sheets

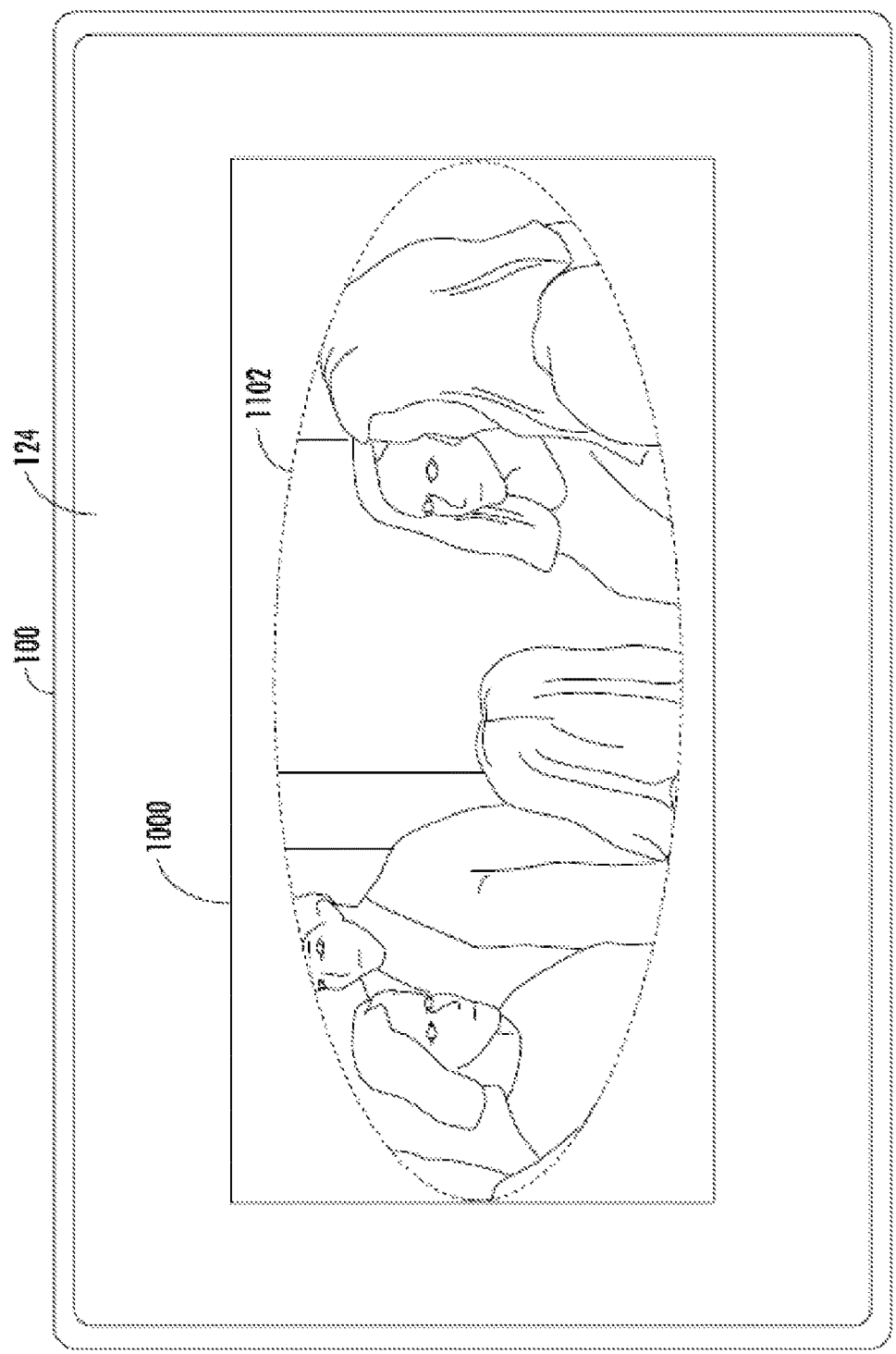

TECHNOLOGIES FOR LOCALIZED AUDIO ENHANCEMENT OF A THREE-DIMENSIONAL VIDEO

BACKGROUND

Many smartphones and other mobile computing devices include one or more cameras, which are operable by a user to capture images and/or video of a desired scene. In some devices, the camera(s) may be embodied as a three-dimensional camera capable of capturing three-dimensional images and videos, which include depth data associated with the captured image or video. The depth data included in three-dimensional images allow users to perform certain post-capture enhancement of the captured images and/or video. For example, a user may select a particular area of the image to enhance (e.g. zoom into) or adjust the focal point of the original image to a desired region based on the depth data.

Although a three-dimensional image or video may be modified as discussed above, any audio associated with the three-dimensional image or video is not modified in a similar way. As such, the resulting enhanced image may include audio that is the same as the audio of the original image. In some situations, the original audio may not correlate correctly or in the desired manner to the enhanced three-dimensional video, which can cause confusion or otherwise lessen the playback experience of the enhanced three-dimensional video.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 10 and 11 are simplified illustrations of a three-dimensional image of a three-dimensional video that may be displayed to a user during execution of the method of FIGS. 6 and 7.

DETAILED DESCRIPTION OF THE DRAWINGS

Figure 1:
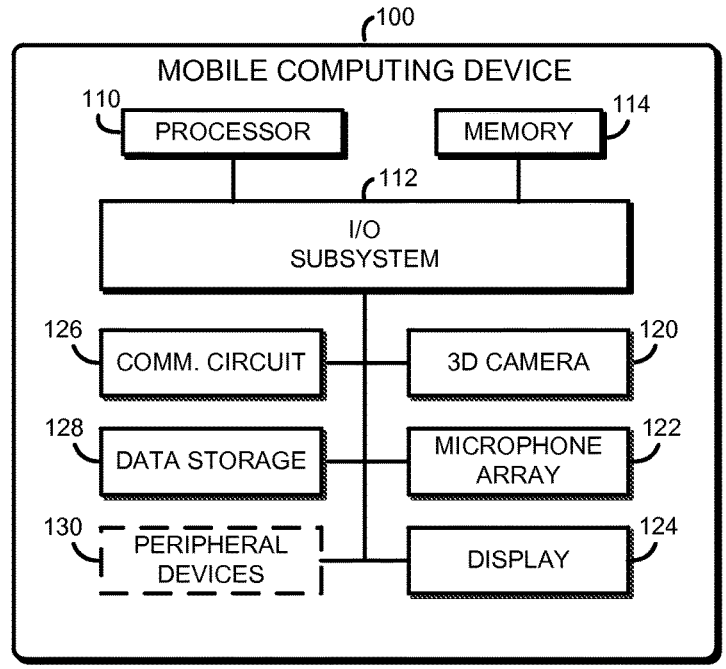
FIG. 1 is a simplified block diagram of at least one embodiment of a mobile computing device for localized audio enhancement of a three-dimensional video.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative mobile computing device 100 for localized audio enhancement of a three-dimensional video includes a three-dimensional camera 120 and a microphone array 122. As discussed in more detail below, a user may operate the mobile computing device 100 to capture a three-dimensional video using the three-dimensional camera 120, as well as the corresponding three-dimensional audio using the microphone array 122. Illustratively, the microphone array 122 includes multiple individual microphones or microphone subarrays (e.g., beamforming microphone subarrays). Each of the microphones or microphone subarrays of the microphone array 122 generate a separate audio signal, which may be combined to form the three-dimensional audio. The mobile computing device 100 stores the three-dimensional video and three-dimensional audio in association with each other. For example, in some embodiments, the mobile computing device 100 generates a mapping of the three-dimensional audio to the three-dimensional video and stores the mapping with the three-dimensional video and three-dimensional audio.

After the user has captured the three-dimensional video and corresponding three-dimensional audio of a desired scene, the user may manipulate the three-dimensional video as normal. For example, the user may zoom in on a selected region, adjust the focal point of the video, and so forth. Additionally, the user may enhance or modify the audio of a localized region of the three-dimensional video. To do so, the user may select a region of a three-dimensional image of the three-dimensional video. For example, the user may draw or otherwise define a boundary line around the desired region of the three-dimensional image using a touchscreen of the mobile computing device 100 or select an individual or group of individuals captured in the three-dimensional image. In response, the mobile computing device 100 is configured to generate an audio component of the three-dimensional audio corresponding to the selected region based on the depth data associated with the selected region. For example, the mobile computing device 100 may utilize the mapping of the three-dimensional audio to the three-dimensional video, along with the depth data associated with the selected region, to determine which microphones of the microphone array 122 is associated with the selected region. The mobile computing device 100 may subsequently apply various signal processing to the separate audio signals generated by the identified individual microphones (again, based on the depth data associated with the selected region) to isolate the audio component corresponding to the selected region.

Figure 3:
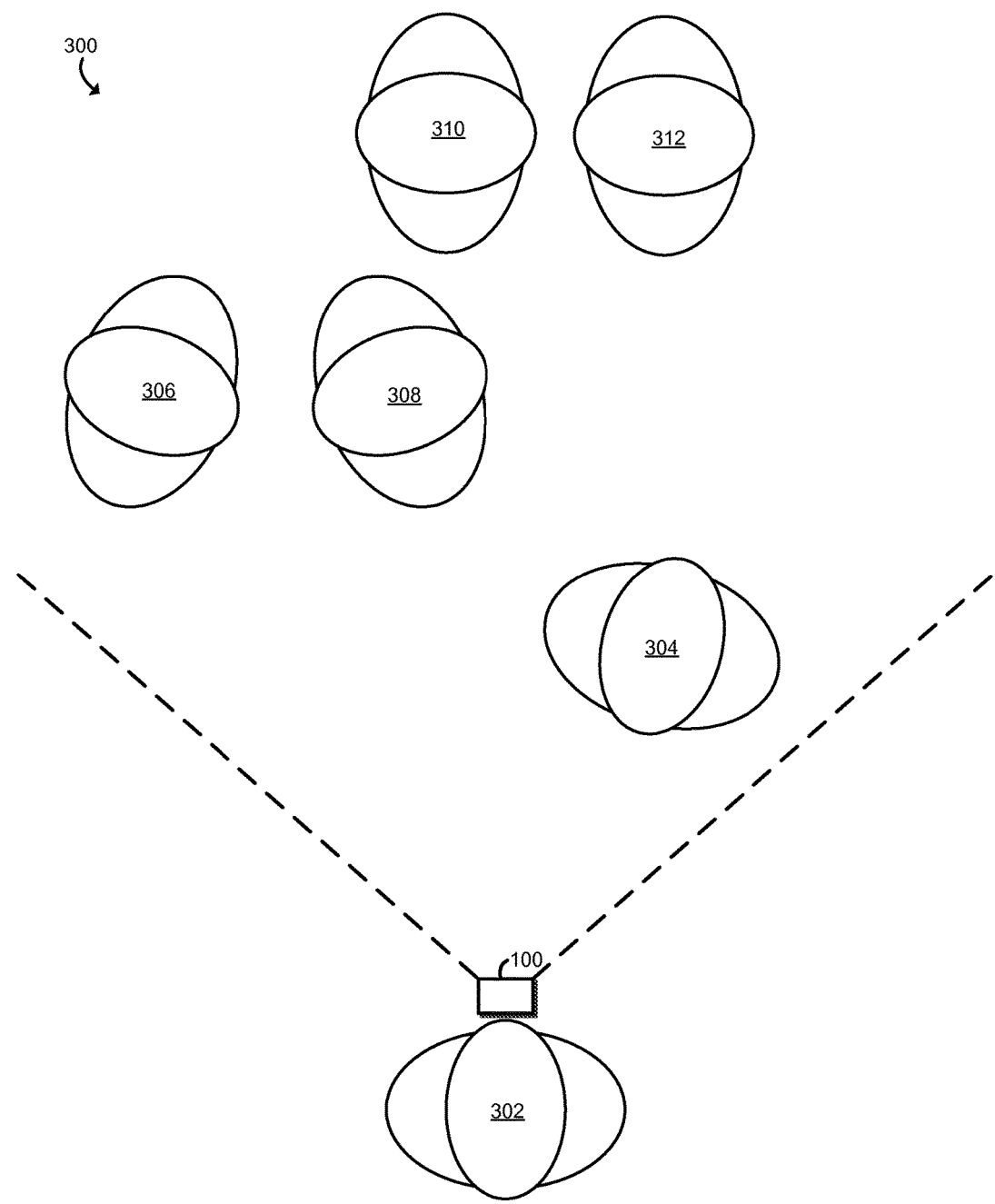
FIG. 3 is a simplified illustration of the mobile computing device of FIG. 1 capturing three-dimensional video and three-dimensional audio of a scene including multiple individuals.

After the audio component corresponding to the selected region has been determined or generated, a user may subsequently enhance or modify the audio component associated with the selected region. For example, the user may increase the volume of the audio component, increase the clarity of the audio component, and/or apply other signal processing to the audio component. The mobile computing device 100 may subsequently store the enhanced audio component with the three-dimensional video as the corresponding audio. In this way, a user may selectively focus the audio on desired regions or individuals captured in the three-dimensional video. For example, as show in in FIG. 3, a user 302 may operate the mobile computing device 100 to capture a three-dimensional video and corresponding three-dimensional audio of a scene 300, which includes an individual 304 located in the forefront of the scene 300 near the user 302, a pair of individuals 306, 308 engaged in a conversation at a middle region of the scene 300, and a pair of individuals 310, 312 engage in a conversation at a far region of the scene 300. Using the technologies described herein, the user 302 may localize and enhance the conversation held by the individuals 306, 308 and/or the individuals 310, 312 by selecting the desired individuals or corresponding region of the three-dimensional video. For example, the user 302 may isolate the conversation held by the individuals 306, 308, increase the volume and clarity of such conversation, and reduce the volume of the conversation held by the individuals 304, 310, 312 such that the final video includes a comprehendible audio of the conversation of the individuals 306, 308.

Referring back to FIG. 1, the mobile computing device 100 may be embodied as any type of mobile computing device capable of performing the functions described herein. For example, the mobile computing device 100 may be embodied as a tablet computer, smartphone, a wearable computing device, a pair of smart glasses, a head-mounted computing device, a cellular phone, a laptop computer, a notebook, a netbook, an Ultrabook™, a smart device, a personal digital assistant, a mobile Internet device, and/or any other computing/communication device. It should be appreciated that, although described herein as a mobile device, the mobile computing device 100 may be embodied as a stationary computing device (e.g., a desktop computer) in other embodiments. As shown in FIG. 1, the illustrative mobile computing device 100 includes a processor 110, an input/output ("I/O") subsystem 112, a memory 114, a three-dimensional camera 120, a microphone array 122, a display 124, a communication circuit 126, and a data storage 128. Of course, the mobile computing device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile computing device 100, on a single integrated circuit chip.

The three-dimensional camera 120 may be embodied as any device, component, or collection thereof capable of capturing images and/or video. In the illustrative embodiment, the three-dimensional camera 120 is embodied as a three-dimensional (3D) colored camera capable of capturing color images including a depth image, channel, or stream. For example, the three-dimensional camera 120 may have an RGBD (red-green-blue-depth) sensor or a similar camera sensor that may capture images having four channels—a depth channel and three color channels (i.e., non-depth channels). Of course, the color values of the image may be represented in another way (e.g., grayscale, HSL, HSV, etc.). Further, in some embodiments, the three-dimensional camera 120 may be embodied as a camera having a sensor configured to capture two-dimensional (2D) images (e.g., color images) and another sensor configured to capture depth. In some embodiments, the three-dimensional camera 120 is embodied as an Intel® RealSense™ camera (e.g., an Intel® RealSense™ model R100 or R200). Further, in some embodiments, each of the images captured by the three-dimensional camera 120 is formatted as a "fat jpg." Of course, in other embodiments, another camera 118 and/or file format suitable for the functions described herein may be used.

It should be appreciated that the camera 118 may determine depth measurements of objects in a scene in a variety of ways depending on the particular three-dimensional camera 120 used. For example, the three-dimensional camera 120 may include an infrared (IR) projector and an IR sensor such that the IR sensor estimates depth values of objects in the scene by analyzing the IR light pattern projected on the scene by the IR projector. In another embodiment, the three-dimensional camera 120 includes at least two lenses and corresponding sensors configured to capture images from at least two different viewpoints of a scene (e.g., a stereo camera). Based on those viewpoints, the mobile computing device 100 may calculate a distance of objects in the captured scene.

The microphone array 122 may be embodied as any number of any type of microphones that are cooperatively capable of capturing three-dimensional audio. In the illustrative embodiments, the microphone array 122 is embodied as six or more separate microphones or microphone arrays, each configured to generate a separate mono audio signal. For example, in a particular embodiment, the microphone array 122 is embodied as six separate beamforming microphone sub-arrays in which each sub-array has a set of individual microphones arranged to collect audio in a relatively narrow beam.

Figure 5:
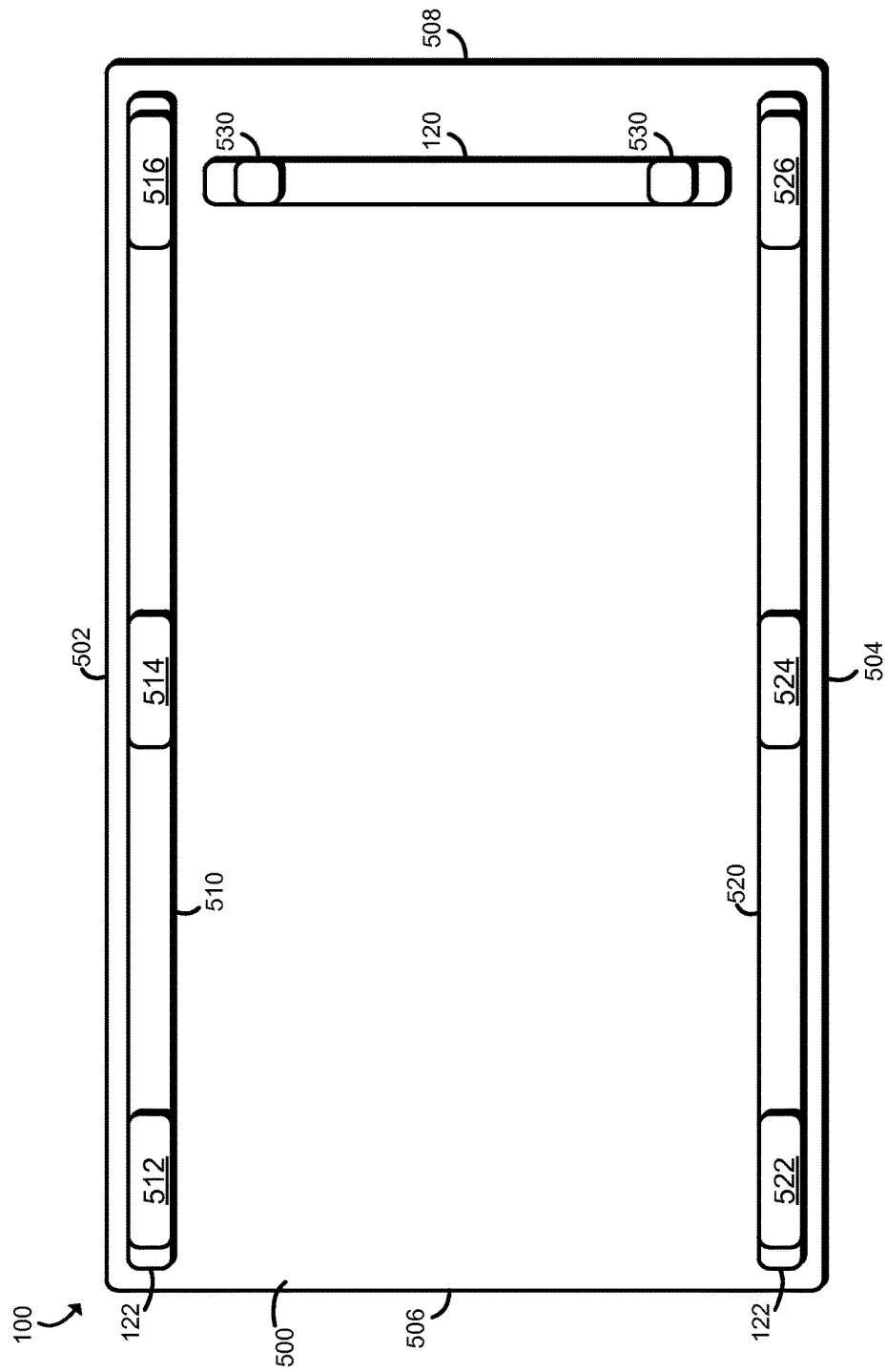
FIG. 5 is a simplified illustration of a rear side of the mobile computing device of FIGS. 1 and 2 positioned in a landscape orientation and showing a microphone array and a three-dimensional camera of the mobile computing device.

The microphone array 122 may be positioned on the mobile computing device 100 in any arrangement that facilitates the generation of three-dimensional audio. For example, in some embodiments as shown in FIG. 5, the microphone array 122 may be embodied as two microphone arrays 510, 520 located on a rear side 500 of the mobile computing device 100. The microphone array 510 is illustratively located near a top side edge 502 of the rear side 500 of the mobile computing device 100, and the microphone array 520 is illustratively located near a bottom side edge 504 of the rear side 500 of the mobile computing device 100. The microphone arrays 510, 520 are separated by the three-dimensional camera 120, which illustratively includes two camera sensors 530. The microphone array 510 illustratively includes a central microphone or microphone sub-array 514, a lateral microphone or microphone sub-array 512 located toward an end 506 of the rear side 800, and another lateral microphone or microphone sub-array 516 located toward another end 508 of the rear side 500 opposite the end 506. Similarly, the microphone array 512 illustratively includes a central microphone or microphone sub-array 524, a lateral microphone or microphone sub-array 522 located toward the end 506 of the rear side 500, and another lateral microphone or microphone sub-array 526 located toward the other end 508 of the rear side 500. In this way, the microphones or sub-arrays 512, 514, 516 and 522, 524, 526 are spaced apart from each other to facilitate the capturing of audio in a three-dimensional format. Of course, the microphone array 122 may be embodied as a different set of microphones or microphone sub-arrays and arranged in a different arrangement on the mobile computing device 100 in other embodiments.

In other embodiments, the microphone array 122 may located remotely from the mobile computing device 100. That is, the microphone array 122 may be embodied as a collection of microphones separate from the mobile computing device 100, but communicatively coupled thereto. For example, the microphone array 122 may include a set of microphones positioned at known and fixed locations relative to the mobile computing device 100. In such embodiments, each of the microphone array 122 may be communicatively coupled to the mobile computing device 100 via a modular mixer device such that the received audio tracks in line with the video stream captured by the three-dimensional camera 120.

Referring back to FIG. 1, the display 124 of the mobile computing device 100 may be embodied as any type of display on which a captured three-dimensional video may be displayed to a user of the mobile computing device 100. In the illustrative embodiment, the display 124 is embodied as a touchscreen display capable of receiving tactile user input. The display 124 may be embodied as, or otherwise use any suitable display technology including, for example, a liquid crystal display (LCD), a light emitting diode (LED) display, a cathode ray tube (CRT) display, a plasma display, and/or other display technology. In embodiments in which the display 124 is not a touchscreen display, the mobile computing device 100 may include another component/device to receive user input.

The communication circuit 126 may be embodied as any communication circuit, device, or collection thereof, capable of enabling communications between the mobile computing device 100 and other remote devices over a network. The communication circuit 126 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The data storage 128 may be embodied as any type of device or devices configured for short-term or long-term storage of data such as, for example, memory devices and circuits, memory cards, hard disk drives, solid-state drives, or other data storage devices. The data storage 128 and/or the memory 114 may store various data during operation of the mobile computing device 100 as described herein.

In some embodiments, the mobile computing device 100 may also include one or more peripheral devices 130. The peripheral devices 130 may include any number of additional peripheral or interface devices, such as speakers, additional storage devices, and so forth. The particular devices included in the peripheral devices 130 may depend on, for example, the type and/or intended use of the mobile computing device 100.

Figure 2:
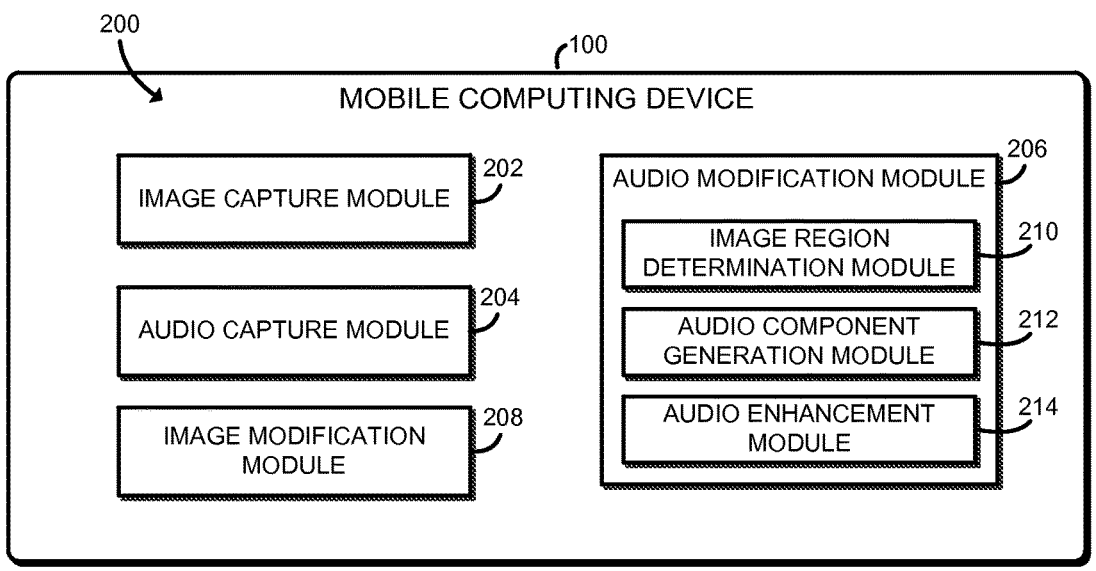
FIG. 2 is a simplified block diagram of at least one embodiment of an environment that may be established by the mobile computing device of FIG. 1.

Referring now to FIG. 2, in use, the mobile computing device 100 establishes an environment 200. The illustrative environment 200 includes an image capture module 202, an audio capture module 204, an audio modification module 206, and an image modification module 208. Additionally, the audio modification module 206 illustratively includes an image region determination module 210, and audio component generation module 212, and an audio enhancement module 214. Each of the modules and other components of the environment 200 may be embodied as firmware, software, hardware, or a combination thereof. For example the various modules, logic, and other components of the environment 200 may form a portion of, or otherwise be established by, the processor 110, the I/O subsystem 112, an SoC, or other hardware components of the mobile computing device 100. As such, in some embodiments, any one or more of the modules of the environment 200 may be embodied as a circuit or collection of electrical devices (e.g., an image capture circuit, an audio capture circuit, an audio modification circuit, an image modification circuit, etc.). Additionally, in some embodiments, one or more of the illustrative modules may form a portion of another module and/or one or more of the illustrative modules may be independent of one another.

The image capture module 202 is configured to control operation of the three-dimensional camera 120 to capture and generate a three-dimensional image and/or video. As discussed above, the generated three-dimensional video includes a depth channel or depth data indicative of the relative depth of various objects captured in the three-dimensional video.

Similar to the image capture module 202, the audio capture module 204 is configured to control operation of the microphone array 122 to capture a three-dimensional audio associated with the three-dimensional image. For example, the audio capture module 204 may capture the three-dimensional audio contemporaneously with the image capture module 202 capturing the three-dimensional video or image. As discussed above, the captured three-dimensional audio may be embodied as a set of separate mono audio signals generated by each microphone or microphone sub-array of the microphone array 122. Additionally, the audio capture module 204 may store the captured three-dimensional audio in association with the captured three-dimensional video in the data storage 128. For example, in some embodiments, the audio capture module 204 may generate a mapping of the three-dimensional audio to the three dimensional video based on the depth data associated with the three-dimensional video, the arrangement of the microphone array 122, and/or other criteria or considerations.

The audio modification module 206 is configured to facilitate enhancement or modification of an audio component of the three-dimensional audio based on a user-selected region of a three-dimensional image/video. To do so, the image region determination module 210 is configured to display a three-dimensional image/video on the display 124 and determine a selected region of the three-dimensional image/video based on a user selection. For example, the user may select the desired region of the three-dimensional image/video by circling the region on the displayed three-dimensional image/video using the touchscreen of the display 124. Alternatively, in some embodiments, the user may select one or more individuals or objects captured in the three-dimensional image/video by clicking on or otherwise selecting the individuals or objects. In such embodiments, the image region determination module 210 may perform an object identification procedure on the three-dimensional image/video to determine the selected object or individual from the three-dimensional image/video.

The audio component generation module 212 is configured to determine or otherwise generate an audio component of the three-dimensional audio that corresponds to the selected region of the three-dimensional image/video. To do so, the audio component generation module 212 may analyze the depth data associated with the selected region and generate the audio component from the three-dimensional audio based on the associated depth data. For example, the audio component generation module 212 may utilize the mapping of the three-dimensional audio to the three-dimensional video, along with the depth data associated with the selected region, to determine which microphones of the microphone array 122 are associated with the selected region and apply signal processing to the separate mono audio signals generated by the identified individual microphones (or microphone sub-arrays) to generate the audio component corresponding to the selected region. In some embodiments, the audio component generation module 212 may isolate the audio component from other audio components of the three-dimensional audio.

The audio enhancement module 214 is configured to modify or enhance the audio component corresponding to the selected region of the three-dimensional image/video. For example, the audio enhancement module 214 may increase the volume of the of the corresponding audio component, increase the clarity of the corresponding audio component, decrease the volume of other audio components of the three-dimensional audio, and/or apply other signal processing to the corresponding audio component. The audio enhancement module 214 may subsequently store the enhanced audio component with the three-dimensional video as the corresponding audio in the data storage 128, as well as any updated mapping of the three-dimensional audio to three-dimensional video as discussed below.

The image modification module 208 is configured to facilitate user modification of the three-dimensional image/video. For example, the image modification module 208 may allow the user to change a focal point of the three-dimensional image/video, zoom into the selected region, crop the selected region from the three-dimensional image/video, move the selected region within the three-dimensional image/video, and/or perform any other modification commonly associated with three-dimensional image/videos. Additionally, the image modification module 208 cooperates with the audio modification module 206 to correlate the modification of the three-dimensional image/video and the corresponding audio component. For example, in an embodiment in which the user decides to move the selected region to a new location in the three-dimensional image, the audio modification module 206 may be configured to update the mapping of the three-dimensional audio to the three-dimensional video to move the audio component to correspond with the new location of the selected region as discussed in more detail below.

Figure 4:
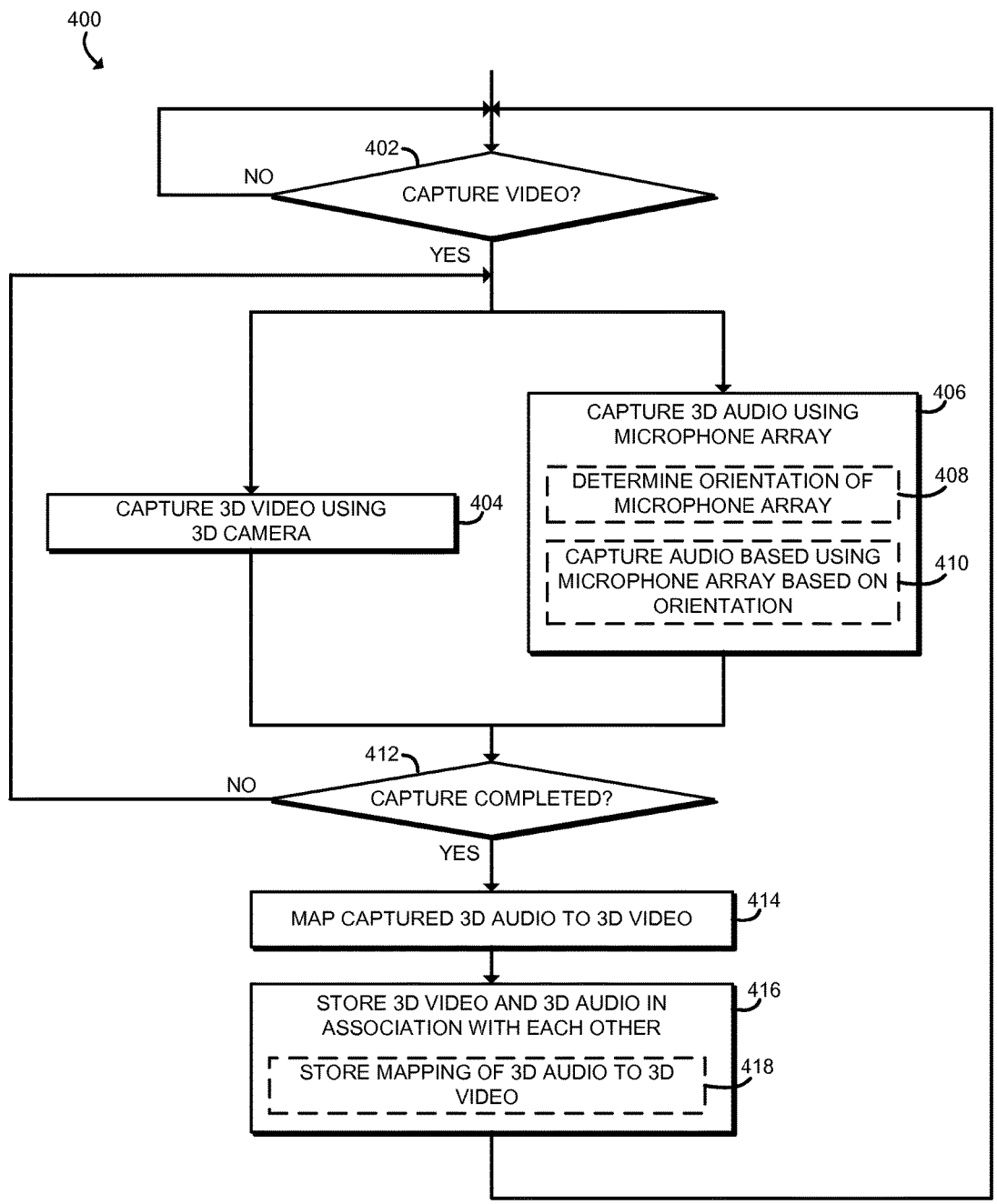
FIG. 4 is a simplified flow diagram of at least one embodiment of a method of capturing three-dimensional video and three-dimensional audio, which may be executed by the mobile computing device of FIGS. 1 and 2.

Referring now to FIG. 4, in use, the mobile computing device 100 may execute a method 400 for capturing three-dimensional video and three-dimensional audio. The method 400 begins with block 402 in which the mobile computing device 100 determines whether the user desires to capture a three-dimensional video. For example, the user may select an appropriate user application or user interface device to cause the mobile computing device 100 to begin recording. If so, the method 400 advances to blocks 404, 406, which may be executed contemporaneously with each other. In block 404, the mobile computing device 100 captures the three-dimensional video using the three-dimensional camera 120. As discussed above, the generated three-dimensional video includes a depth channel or depth data indicative of the relative depth of various objects captured in the three-dimensional video. Additionally, in block 406, the mobile computing device 100 contemporaneously captures three-dimensional audio associated with the three-dimensional video using the microphone array 122. Again, as discussed above, the captured three-dimensional audio may be embodied as a set of separate mono audio signals generated by each microphone or microphone sub-array of the microphone array 122.

Figure 6:
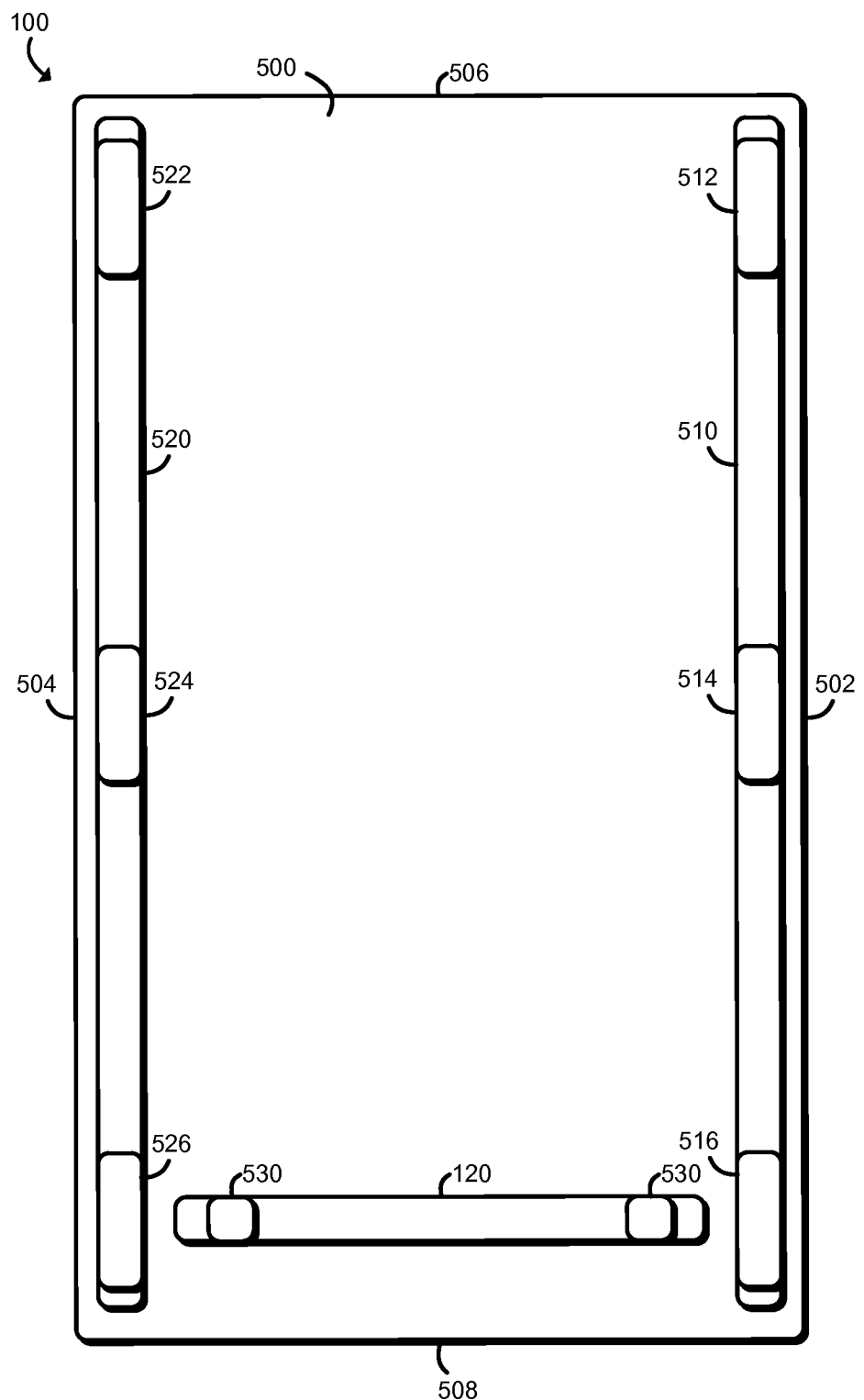
FIG. 6 is a simplified illustration of the rear side of the mobile computing device of FIG. 5 positioned in a portrait orientation.

In some embodiments, the captured three-dimensional audio may be dependent on the orientation of the microphone array 122 (i.e., the orientation of the mobile computing device 100 in embodiments in which the microphone array 122 integrated into the mobile computing device 100). As such, the mobile computing device 100 may determine the present orientation (e.g., landscape or portrait) of the microphone array 122 in block 408 and capture the three-dimensional audio based on the present orientation in block 410. It should be appreciated that the orientation of the microphone array 122 may affect the mapping of the captured three dimensional audio to the three-dimensional image/video. For example, as shown in FIG. 5, the illustrative mobile computing device 100 may be positioned in a landscape orientation to increase the horizontal granularity of the captured three-dimensional audio due to the increased number of microphones or microphone arrays 512, 514, 516 and 522, 524, 526 arranged along corresponding horizontal planes. Conversely, as shown in FIG. 6, the mobile computing device 100 may be positioned in a portrait orientation to increase the vertical granularity of the captured three-dimensional audio due to the increased number of microphones or microphone arrays 512, 514, 516 and 522, 524, 526 arranged along corresponding vertical planes. Of course, the effect on the captured three-dimensional audio due to the orientation of the microphone array 122 (or mobile computing device 100) depends on the arrangement of the microphone array 122 and, in some embodiments, the microphone array 122 may be arranged such that the captured three-dimensional audio is substantially similar regardless of the orientation of the mobile computing device 100 (e.g., in those embodiments in which the microphone array 122 is separate from the mobile computing device 102).

Referring back to FIG. 4, after the mobile computing device 100 captures the three-dimensional video in block 404 and the three-dimensional audio in block 406, the method 400 advances to block 412. In block 412, the mobile computing device 100 determines whether the video capture is complete. For example, the user may indicate that the video capture is complete by reselecting the appropriate user application or user interface device to cause the mobile computing device 100 to stop recording. If the mobile computing device 100 determines that the video capture is not complete, the method 400 loops back to blocks 404 and 406 to continue capturing the three-dimensional video and associated three-dimensional audio.

Figure 7:
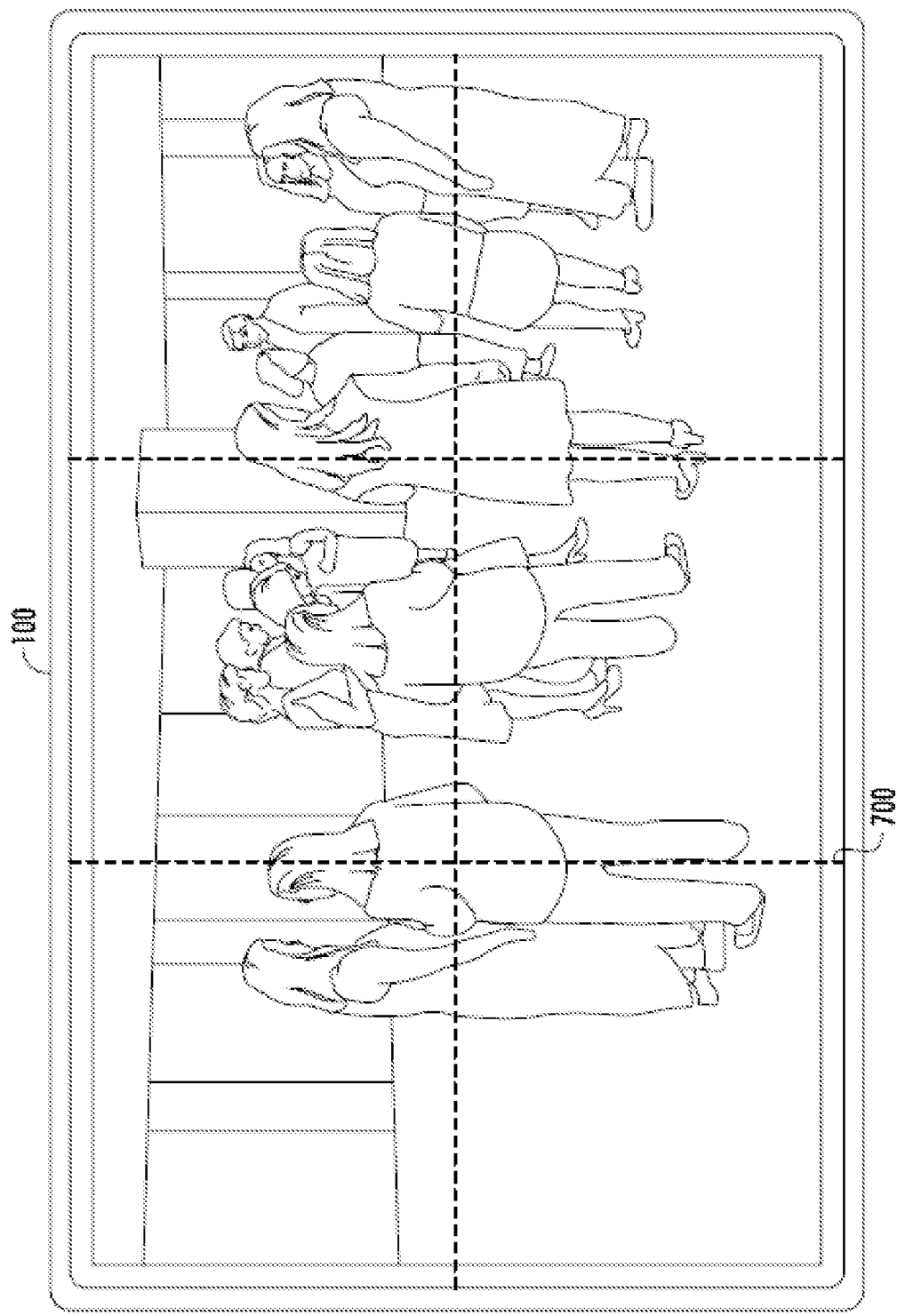
FIG. 7 is a simplified illustration of at least one embodiment of a mapping of the three-dimensional audio to a three-dimensional image of the three-dimensional video captured by the mobile computing device of FIGS. 1 and 2.

If, however, the mobile computing device 100 determines that the video capture is complete, the method 400 advances to block 414. In block 414, the mobile computing device 100 generates a mapping of the three-dimensional audio to the three-dimensional video. The mapping may be embodied as any type of data capable of relating the three-dimensional audio to the three-dimensional video, including the depth data. For example, as shown in FIG. 7, the mobile computing device 100 may generate a mapping 700 that maps the individual microphone or microphone sub-arrays of the microphone array 122 to predefined regions of the three-dimensional video. It should be appreciated that the mapping 700 is dependent upon the configuration of the microphone array 122 and may be different in those embodiments in which the microphone array 122 has a different arrangement. Additionally, it should be appreciated that the mapping generated in block 414 may be based on the orientation of the mobile computing device 100 while capturing the three-dimensional video and audio.

In block 416, the mobile computing device 100 stores the captured three-dimensional video and three-dimensional audio in the data storage 128 in association with each other. Additionally, in block 418, the mobile computing device 100 may store the mapping generated in block 414 in the data storage 128 in association with the stored three-dimensional video and three-dimensional audio.

As discussed above, the mobile computing device 100 facilitates the localized enhancement or modification of the three-dimensional audio associated with the captured three-dimensional video. To do so, the mobile computing device 100 may execute a method 800 for localized audio enhancement. The method 800 begins with block 802 in which the mobile computing device 100 determines whether the user desires to modify the three-dimensional audio associated with the captured three-dimensional video. For example, the user may select an appropriate user application or user interface device to enter an editing mode of the three-dimensional video.

Figure 10:
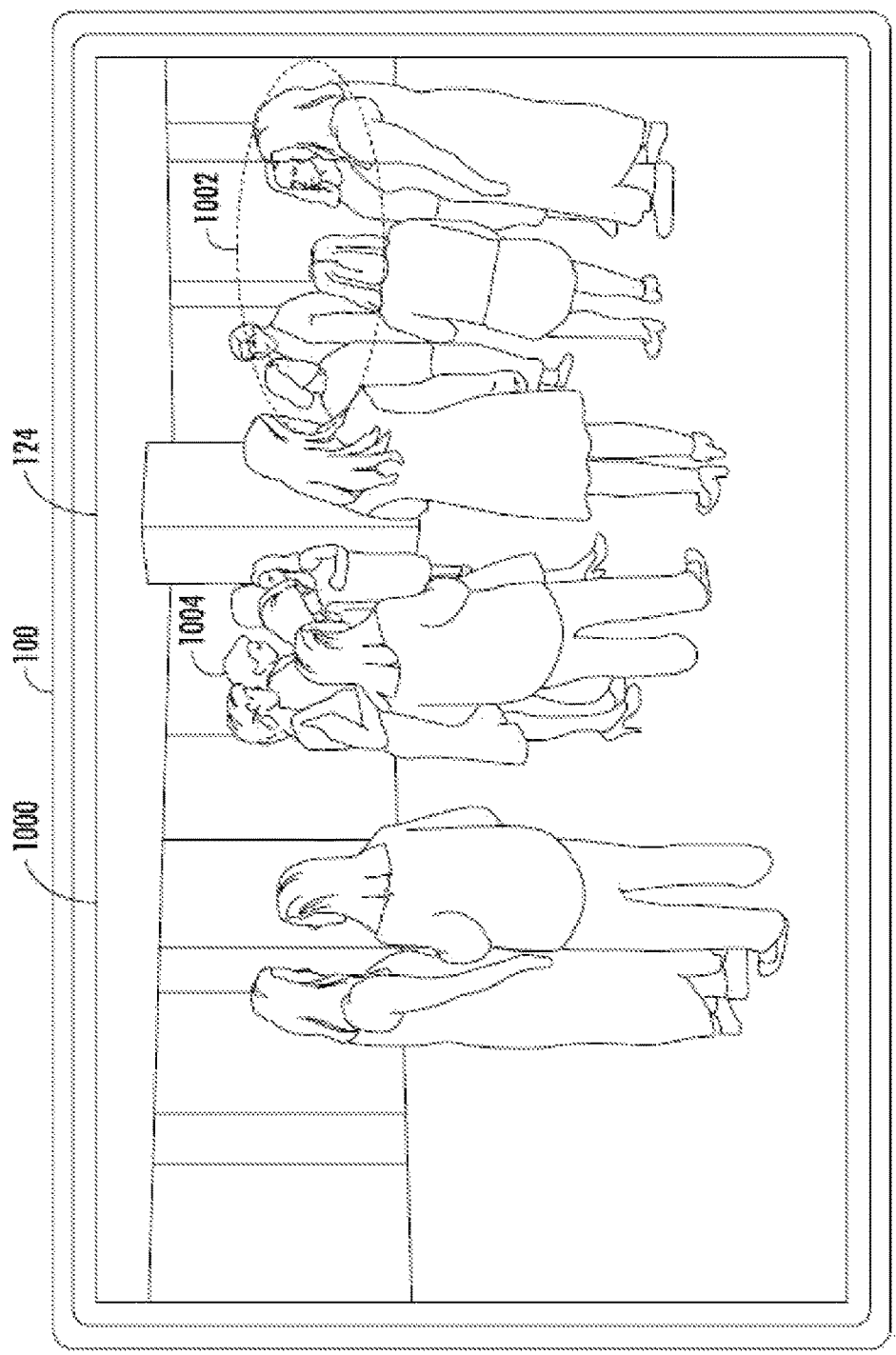

If the mobile computing device 100 determines that the user desires to modify the captured three-dimensional audio, the method 800 advances to block 804. In block 804, the mobile computing device determines a region of a three dimensional image/video based on a user selection. For example, as shown in FIG. 10, the mobile computing device 100 may display a three-dimensional image 1000 of the three-dimensional video on the display 124, and the user may interact with the display 124 to select a region of the three-dimensional image/video. To do so, the user may use any suitable methodology to select the desired region. For example, in block 806, the mobile computing device 100 determines the selected region based on a boundary defined by the user. That is, as shown in FIG. 10, the user may "draw" a boundary line 1002 or other delineator on the three-dimensional image/video using the touchscreen of the display 124. In response, the mobile computing device 100 is configured to determine the selected region as the region encompassed by the drawn boundary line or delineator in block 806. Additionally or alternatively, the user may select an individual, group of individuals, or object captured in the three-dimensional image/video by, for example, tapping on the individual(s) or object(s) on the touchscreen of the display 124. For example, as shown in FIG. 10, the user may select an individual 1004 by tapping on the individual 1004 in the three-dimensional image 1000. In response, the mobile computing device 100 determines the selected region as the selected individual(s) and/or object(s) in block 808. To do so, as discussed above, the mobile computing device 100 may be configured to perform an object detection or recognition procedure on the three-dimensional image/video to facilitate the selection of an object or individual therefrom.

After the user-selected region has been determined in block 804, the method 800 advances to block 810 in which the mobile computing device 100 generates or determines an audio component of the three-dimensional audio that corresponds to the selected region of the three-dimensional image/video. To do so, the mobile computing device 100 may analyze the depth data associated with the selected region of the three-dimensional image/video and generate the audio component corresponding to the selected region from the three-dimensional audio based on the associated depth data in block 812. For example, as discussed above, the mobile computing device 100 may utilize the mapping of the three-dimensional audio to the three-dimensional video, along with the depth data associated with the selected region, to generate or otherwise determine the audio component corresponding to the selected region in block 814. To do so, the mobile computing device 100 may determine which microphones of the microphone array 122 are associated with the selected region based on the mapping and apply signal processing to the separate mono audio signals generated by the identified individual microphones (or microphone sub-arrays) to generate the audio component corresponding to the selected region. Additionally, in some embodiments in block 816, the mobile computing device 100 may isolate the audio component corresponding to the selected region of the three-dimensional image/video from other audio components of the three-dimensional audio. To do so, in block 818, the mobile computing device 100 may apply various signal processing to the three-dimensional audio to isolate the corresponding audio component. In such embodiments, the other audio components of the three-dimensional audio may be discarded or otherwise minimized.

After the mobile computing device 100 has generated the audio component of the three-dimensional audio corresponding to the selected region of the three-dimensional image/video in block 810, the method 800 advances to block 820. In block 820, the mobile computing device 100 determines whether the user desires to playback the generated audio component. If so, the method 800 advances to block 822 in which the mobile computing device 100 plays the audio component generated in block 810. Additionally, in some embodiments, the mobile computing device 100 may play the three-dimensional video (or just the selected region of the three-dimensional video) in association with the playback of the audio component to allow the user to review the presently modified audio and video in conjunction.

Figure 9:
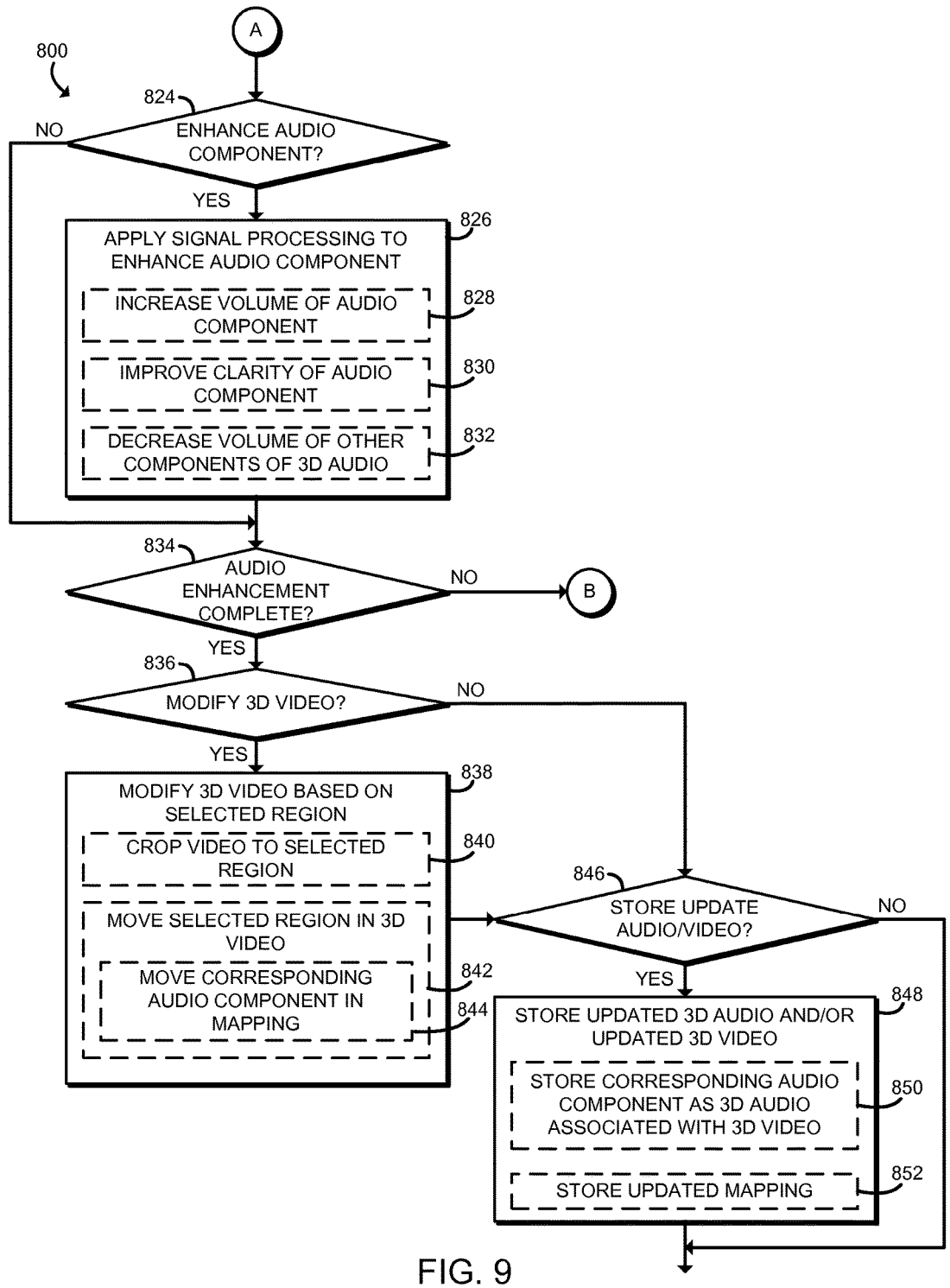

If the user does not desire to play the audio component or after the audio component has been played, the method 800 advances to block 824 of FIG. 9. In block 824, the mobile computing device 100 determines whether the user desires to enhance the audio component generated in block 810. If so, the method 800 advances to block 826 in which the mobile computing device 100 applies various signal processing to enhance the audio component as selected by the user. The mobile computing device 100 may be configured to enhance the audio component in any manner commonly used to enhance or modify audio. For example, in block 828, the mobile computing device 100 may increase the volume of the audio component. Additionally or alternatively, the mobile computing device 100 may improve the clarity of the audio component in block 830. Further, in block 832, the mobile computing device 100 may decrease the volume of other audio components of the thee-dimensional audio to thereby further isolate the audio component corresponding to the selected region of the three-dimensional image/video. It should be appreciated that the mobile computing device 100 may utilize any suitable signal processing technique or mechanism to enhance the audio component in block 826.

Figure 8:
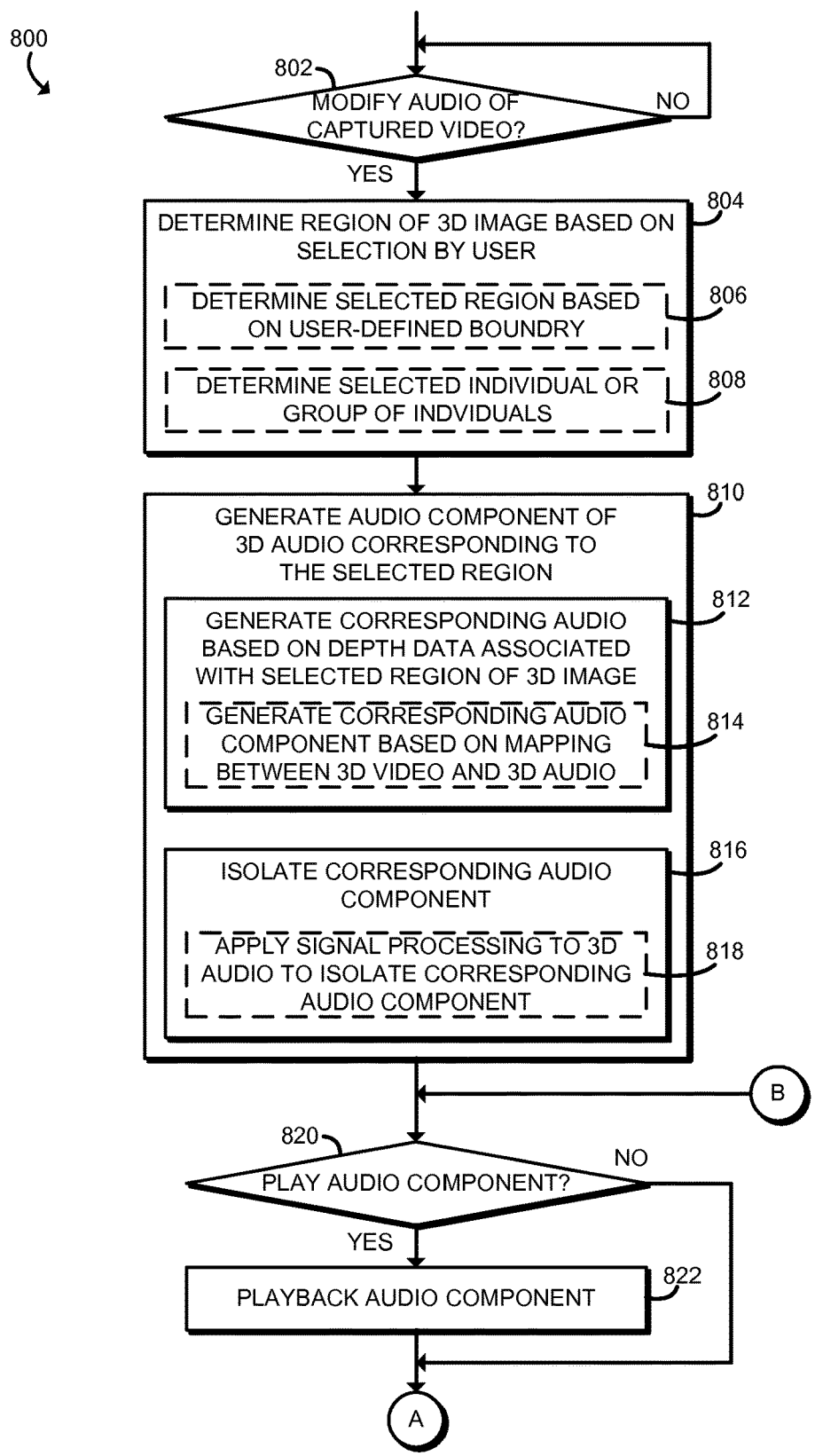
FIGS. 8 and 9 area a simplified flow diagram of at least one embodiment of a method for localized audio enhancement of a three-dimensional video, which may be executed by the mobile computing device of FIGS. 1 and 2.

After the generated audio component has been enhanced in block 826 or if no enhancement is desired, the method 800 advances to block 834 in which the mobile computing device 100 determines whether the audio enhancement is complete. If not, the method 800 loops back to block 820 of FIG. 8 in which the mobile computing device 100 determines whether the user desires to playback of the current version of the audio component, which may have been enhanced in block 826. Alternatively, if the mobile computing device 100 determines that the audio enhancement of the audio component is complete in block 834 (e.g., based on a selection or direction from the user), the method 800 advances to block 836 in which the mobile computing device 100 determines whether the user desires to modify the three-dimensional video/image. If not, the method 800 advances to block 846 described below. If, however, the mobile computing device 100 determines that the user desires to modify the three-dimensional image/video, the method 800 advances to block 838.

In block 838, the mobile computing device 100 is configured to modify the three-dimensional image/video based on the selected region. For example, in block 840, the mobile computing device 100 may crop the three-dimensional video to the selected region (see, e.g., cropped selected region 1000 of FIG. 11). Additionally or alternatively, the mobile computing device 100 may move the selected region of the three-dimensional video from an original location to a new location in the three-dimensional video based on direction from the user (e.g., via the touch-screen of the display 124) in block 842. In such embodiments, the mobile computing device 100 may also move the audio component corresponding to the selected region as determined in block 810 in the mapping of the three-dimensional audio to the three-dimensional video in block 844 such that location of the audio component matches the new location of the selected region. Of course, additional or other modification may be performed on the three-dimensional video/image in block 838, such as those commonly performed on a three-dimensional video (e.g., adjustment of the focal point).

After the mobile computing device 100 has modified the three-dimensional video/image in block 838 or if no modification of the three-dimensional image/video is desired, the method 800 advances to block 846. In block 846, the mobile computing device 100 determines whether to store the updated or modified three-dimensional image/video and associated three-dimensional audio, which may be embodied as the enhanced audio component. If so, the method 800 advances to block 848 in which the audio component corresponding to the selected region of the three-dimensional image/video and the updated three-dimensional image/video are stored in the data storage 128. For example, in block 850, the mobile computing device 100 may store the audio component corresponding to the selected region of the three-dimensional image/video and the updated three-dimensional image/video (if any) in association with each other in the data storage 128. Additionally, in embodiments in which the mapping of the three-dimensional audio to the three-dimensional video has been updated (see, e.g., block 844), the mobile computing device 100 may store the updated mapping the data storage 128.

It should be appreciated that the technologies described herein facilitate the localization of an audio component corresponding to a region of three-dimensional image/video. The localized audio component may be subsequently enhanced or improved to selectively listen to various regions of the three-dimensional image/video.

EXAMPLES

Illustrative examples of the technologies disclosed herein are provided below. An embodiment of the technologies may include any one or more, and any combination of, the examples described below.

Example 1 includes a mobile computing device for localized audio enhancement of a three-dimensional image. The mobile computing device includes a display; a three-dimensional camera to capture a three-dimensional image, wherein the three-dimensional image includes depth data; an audio capture module to receive a three-dimensional audio associated with the three-dimensional image from a microphone array; an image region determination module to determine a selected region of the three-dimensional image displayed on the display based on a user selection; an audio component generation module to generate an audio component of the three-dimensional audio corresponding to the selected region based on the depth data associated with the selected region; and an audio enhancement module to enhance the audio component.

Example 2 includes the subject matter of Example 1, and wherein the three-dimensional image comprises a three-dimensional image from a three-dimensional video.

Example 3 includes the subject matter of Example 1 or 2, and wherein the microphone array comprises at least six beamforming microphone sub-arrays.

Example 4 includes the subject matter of any of Examples 1-3, and wherein the microphone array comprises at least six microphones.

Example 5 includes the subject matter of any of Examples 1-4, and wherein to capture the three-dimensional audio comprises to capture a separate mono audio signal with each microphone of the microphone array.

Example 6 includes the subject matter of any of Examples 1-5, and wherein the microphone array is remote from, and communicatively coupled to, the mobile computing device.

Example 7 includes the subject matter of any of Examples 1-6, and wherein the microphone array comprises a first microphone array located on a rear side of the mobile computing device toward a first sidewall, wherein the first microphone array comprises a first microphone located centrally on the rear side, a second microphone located laterally of the first microphone toward a first end of the mobile computing device, and a third microphone located laterally of the first microphone toward a second end of the mobile computing device opposite the first end, and a second microphone array located on the rear side of the mobile computing device toward a second sidewall opposite the first sidewall, wherein the second microphone array comprises a fourth microphone located centrally on the rear side, a fifth microphone located laterally of the fourth microphone toward the first end of the mobile computing device, and a sixth microphone located laterally of the fourth microphone toward the second end of the mobile computing device.

Example 8 includes the subject matter of any of Examples 1-7, and wherein the audio capture module is further to generate a mapping of the three-dimensional audio to the three-dimensional image based on an arrangement of the microphone array.

Example 9 includes the subject matter of any of Examples 1-8, and herein to generate the mapping comprises to determine an orientation of the microphone array while the three-dimensional audio is captured, and generate a mapping of the three-dimensional audio to the three-dimensional image based on the orientation of the microphone array.

Example 10 includes the subject matter of any of Examples 1-9, and wherein the image region determination module is to determine the selected region based on a user-defined boundary defined the three-dimensional image via the display.

Example 11 includes the subject matter of any of Examples 1-10, and wherein to determine the selected region of the three-dimensional image comprises to determine at least one individual captured in the three-dimensional image based on a user selection.

Example 12 includes the subject matter of any of Examples 1-11, and wherein to generate the audio component of the three-dimensional audio corresponding to the selected region comprises to generate the audio component based on a mapping of the three-dimensional audio to the three-dimensional image.

Example 13 includes the subject matter of any of Examples 1-12, and wherein to generate the audio component of the three-dimensional audio corresponding to the selected region comprises to isolate the audio component corresponding to the selected region from other audio components of the three-dimensional audio.

Example 14 includes the subject matter of any of Examples 1-13, and wherein the audio enhancement module is further to play the audio component in association with the three-dimensional image.

Example 15 includes the subject matter of any of Examples 1-14, and wherein to generate the audio component of the three-dimensional audio comprises to apply signal processing to the three-dimensional audio to generate the audio component of the three-dimensional audio corresponding the selected region.

Example 16 includes the subject matter of any of Examples 1-15, and wherein to apply the signal processing to the three-dimensional audio comprises to apply signal processing to at least two separate mono audio signals of a plurality of mono audio signal that form the three-dimensional audio.

Example 17 includes the subject matter of any of Examples 1-16, and wherein to enhance the audio component comprises to enhance the audio component based on another user selection.

Example 18 includes the subject matter of any of Examples 1-17, and wherein to enhance the audio component comprises at least one of (i) to apply signal processing to the audio component to increase a volume of the audio component, (ii) to apply signal processing to the audio component to improve a clarity of the audio component, or (iii) to apply signal processing to another audio component of the three-dimensional audio other than the audio component to decrease the volume of the another audio component.

Example 19 includes the subject matter of any of Examples 1-18, and further comprising a local data storage and wherein the audio enhancement module is further to store the enhanced audio component in the local data storage.

Example 20 includes the subject matter of any of Examples 1-19, and further comprising an image modification module to modify the three-dimensional image based on the selected region.

Example 21 includes the subject matter of any of Examples 1-20, and wherein to modify the three-dimensional image comprises to crop the three-dimensional image based on the selected region.

Example 22 includes the subject matter of any of Examples 1-21, and wherein to modify the three-dimensional image comprises to move the selected region of the three-dimensional image from an original location to a new location in the three-dimensional image, and wherein the audio enhancement module is to update a mapping of the three-dimensional audio to the three-dimensional image to move the audio component corresponding to the selected region based on the new location of the selected region.

Example 23 includes the subject matter of any of Examples 1-22, and further comprising a local data storage and wherein the image modification module is to store the modified three-dimensional image in the local data storage.

Example 24 includes the subject matter of any of Examples 1-23, and wherein to store the modified three-dimensional image in association with the audio component comprises store the updated mapping in the local data storage.

Example 25 includes a method for localized audio enhancement of a three-dimensional image. The method includes receiving, by the a mobile computing device, a three-dimensional audio associated with the three-dimensional image from a microphone array; determining, by the mobile computing device, a selected region of a three-dimensional image based on a selection by a user of the mobile computing device; generating, by the mobile computing device, an audio component of the three-dimensional audio corresponding to the selected region based on depth data of the three-dimensional image associated with the selected region; and enhancing, by the mobile computing device, the audio component.

Example 26 includes the subject matter of Example 25, and wherein receiving the three-dimensional audio comprises receiving a three-dimensional audio associated with a three-dimensional video, wherein the three-dimensional video comprises the three-dimensional image.

Example 27 includes the subject matter of Example 26, and wherein receiving the three-dimensional audio comprises receiving the three-dimensional audio from a microphone array including at least six beamforming microphone sub-arrays.

Example 28 includes the subject matter of any of Examples 25-27, and wherein receiving the three-dimensional audio comprises receiving the three-dimensional audio from a microphone array including at least six microphones.

Example 29 includes the subject matter of any of Examples 25-28, and wherein receiving the three-dimensional audio comprises receiving a separate mono audio signal from each microphone of the microphone array.

Example 30 includes the subject matter of any of Examples 25-29, and wherein receiving the three-dimensional audio comprises receiving, by the mobile computing device, the three-dimensional audio from a microphone array remote from, and communicatively coupled to, the mobile computing device.

Example 31 includes the subject matter of any of Examples 25-30, and generating, by the mobile computing device, a mapping of the three-dimensional audio to the three-dimensional image based on an arrangement of the microphone array.

Example 32 includes the subject matter of any of Examples 25-31, and wherein generating the mapping comprises determining, by the mobile computing device, an orientation of the microphone array while capturing the three-dimensional audio, and generating, by the mobile computing device, a mapping of the three-dimensional audio to the three-dimensional image based on the orientation of the mobile computing device.

Example 33 includes the subject matter of any of Examples 25-32, and wherein determining the selected region of the three-dimensional image comprises determining, by the mobile computing device, the selected region of the three-dimensional image based on a boundary defined by the user on the three-dimensional image.

Example 34 includes the subject matter of any of Examples 25-33, and wherein determining the selected region comprises determining, by the mobile computing device, at least one individual captured in the three-dimensional image based on a selection of the user.

Example 35 includes the subject matter of any of Examples 25-34, and wherein generating the audio component of the three-dimensional audio corresponding to the selected region comprises generating the audio component based on a mapping of the three-dimensional audio to the three-dimensional image.

Example 36 includes the subject matter of any of Examples 25-35, and wherein generating the audio component of the three-dimensional audio corresponding to the selected region comprises isolating the audio component corresponding to the selected region from other audio components of the three-dimensional audio.

Example 37 includes the subject matter of any of Examples 25-36, and further comprising playing, by the mobile computing device, the audio component in association with the three-dimensional image.

Example 38 includes the subject matter of any of Examples 25-37, and wherein generating the audio component of the three-dimensional audio comprises applying, by the mobile computing device, signal processing to the three-dimensional audio to generate the audio component of the three-dimensional audio corresponding the selected region.

Example 39 includes the subject matter of any of Examples 25-38, and wherein applying the signal processing to the three-dimensional audio comprises applying signal processing to at least two separate mono audio signals of a plurality of mono audio signal that form the three-dimensional audio.

Example 40 includes the subject matter of any of Examples 25-39, and wherein enhancing the audio component comprises enhancing the audio component based on another selection by the user.

Example 41 includes the subject matter of any of Examples 25-40, and wherein enhancing the audio component comprises at least one of (i) applying signal processing to the audio component to increase a volume of the audio component, (ii) applying signal processing to the audio component to improve a clarity of the audio component, or (iii) applying signal processing to another audio component of the three-dimensional audio other than the audio component to decrease the volume of the another audio component.

Example 42 includes the subject matter of any of Examples 25-41, and further comprising storing, by the mobile computing device, the enhanced audio component in a local data storage.

Example 43 includes the subject matter of any of Examples 25-42, and further comprising modifying, by the mobile computing device, the three-dimensional image based on the selected region.

Example 44 includes the subject matter of any of Examples 25-43, and wherein modifying the three-dimensional image comprises cropping, by the mobile computing device, the three-dimensional image based on the selected region.

Example 45 includes the subject matter of any of Examples 25-44, and wherein modifying the three-dimensional image comprises: moving, by the mobile computing device, the selected region of the three-dimensional image from an original location to a new location in the three-dimensional image; and updating, by the mobile computing device, a mapping of the three-dimensional audio to the three-dimensional image to move the audio component corresponding to the selected region based on the new location of the selected region.

Example 46 includes the subject matter of any of Examples 25-45, and further comprising storing, by the mobile computing device, the modified three-dimensional image in a local data storage in association with the audio component.

Example 47 includes the subject matter of any of Examples 25-46, and wherein storing the modified three-dimensional image in association with the audio component comprises storing the updated mapping in the local data storage.

Example 48 includes one or more machine-readable storage media comprising a plurality of instructions stored thereon that, when executed, cause a mobile computing device to perform the method of any of Examples 25-47.

Example 49 includes a mobile computing device for localized audio enhancement of a three-dimensional image, the mobile computing device comprising means for receiving a three-dimensional audio associated with the three-dimensional image from a microphone array; means for determining a selected region of a three-dimensional image of the three-dimensional image based on a selection by a user of the mobile computing device; means for generating an audio component of the three-dimensional audio corresponding to the selected region based on depth data of the three-dimensional image associated with the selected region; and means for enhancing the audio component.

Example 50 includes the subject matter of Example 49, and wherein the means for receiving the three-dimensional audio comprises means for receiving a three-dimensional audio associated with a three-dimensional image from a three-dimensional video.

Example 51 includes the subject matter of Example 49 or 50, and wherein the means for receiving the three-dimensional audio comprises means for receiving the three-dimensional audio from a microphone array including at least six beamforming microphone sub-arrays.

Example 52 includes the subject matter of any of Examples 49-51, and wherein the means for receiving the three-dimensional audio comprises means for receiving the three-dimensional audio from a microphone array including at least six microphones.

Example 53 includes the subject matter of any of Examples 49-52, and wherein the means for receiving the three-dimensional audio comprises means for receiving a separate mono audio signal with each microphone of the microphone array.

Example 54 includes the subject matter of any of Examples 49-53, and wherein the means for receiving the three-dimensional audio comprises means for receiving a three-dimensional audio from a microphone array that is remote from, and communicatively coupled to, the mobile computing device.

Example 55 includes the subject matter of any of Examples 49-54, and wherein the means for receiving the three-dimensional audio comprises means for generating a mapping of the three-dimensional audio to the three-dimensional image based on an arrangement of the microphone array.

Example 56 includes the subject matter of any of Examples 49-55, and wherein the means for generating the mapping comprises means for determining an orientation of the mobile computing device while capturing the three-dimensional audio, and means for generating a mapping of the three-dimensional audio to the three-dimensional image based on the orientation of the mobile computing device.

Example 57 includes the subject matter of any of Examples 49-56, and wherein the means for determining the selected region of the three-dimensional image comprises means for determining the selected region of the three-dimensional image based on a boundary defined by the user on the three-dimensional image.

Example 58 includes the subject matter of any of Examples 49-57, and wherein the means for determining the selected region comprises means for determining at least one individual captured in the three-dimensional image based on a selection of the user.

Example 59 includes the subject matter of any of Examples 49-58, and wherein the means for generating the audio component of the three-dimensional audio corresponding to the selected region comprises means for generating the audio component based on a mapping of the three-dimensional audio to the three-dimensional image.

Example 60 includes the subject matter of any of Examples 49-59, and wherein the means for generating the audio component of the three-dimensional audio corresponding to the selected region comprises means for isolating the audio component corresponding to the selected region from other audio components of the three-dimensional audio.

Example 61 includes the subject matter of any of Examples 49-60, and further comprising means for playing the audio component in association with the three-dimensional image.

Example 62 includes the subject matter of any of Examples 49-61, and wherein the means for generating the audio component of the three-dimensional audio comprises means for applying signal processing to the three-dimensional audio to generate the audio component of the three-dimensional audio corresponding the selected region.

Example 63 includes the subject matter of any of Examples 49-62, and wherein the means for applying the signal processing to the three-dimensional audio comprises means for applying signal processing to at least two separate mono audio signals of a plurality of mono audio signal that form the three-dimensional audio.

Example 64 includes the subject matter of any of Examples 49-63, and wherein the means for enhancing the audio component comprises means for enhancing the audio component based on another selection by the user.

Example 65 includes the subject matter of any of Examples 49-64, and wherein the means for enhancing the audio component comprises at least one of (i) means for applying signal processing to the audio component to increase a volume of the audio component, (ii) means for applying signal processing to the audio component to improve a clarity of the audio component, or (iii) means for applying signal processing to another audio component of the three-dimensional audio other than the audio component to decrease the volume of the another audio component.

Example 66 includes the subject matter of any of Examples 49-65, and further comprising the means for storing the enhanced audio component in a local data storage.

Example 67 includes the subject matter of any of Examples 49-66, and further comprising means for modifying the three-dimensional image based on the selected region.

Example 68 includes the subject matter of any of Examples 49-67, and wherein the means for modifying the three-dimensional image comprises means for cropping the three-dimensional image based on the selected region.

Example 69 includes the subject matter of any of Examples 49-68, and wherein the means for modifying the three-dimensional image comprises means for moving the selected region of the three-dimensional image from an original location to a new location in the three-dimensional image; and means for updating a mapping of the three-dimensional audio to the three-dimensional image to move the audio component corresponding to the selected region based on the new location of the selected region.

Example 70 includes the subject matter of any of Examples 49-69, and further comprising means for storing the modified three-dimensional image in a local data storage in association with the audio component.

Example 71 includes the subject matter of any of Examples 49-70, and wherein the means for storing the modified three-dimensional image in association with the audio component comprises means for storing the updated mapping in the local data storage.

The invention claimed is:

1. A mobile computing device for localized audio enhancement of a three-dimensional image, the mobile computing device comprising:
   a display;
   a three-dimensional camera to capture a three-dimensional image, wherein the three-dimensional image includes depth data;
   an audio capture module to (i) receive a three-dimensional audio associated with the three-dimensional image from a microphone array, (ii) determine an orientation of the microphone array while the three-dimensional audio is captured, and (iii) generate a mapping of the three-dimensional audio to the three-dimensional image based on the orientation of the microphone array;
   an image region determination module to determine a selected region of the three-dimensional image displayed on the display based on a user selection;
   an audio component generation module to generate an audio component of the three-dimensional audio corresponding to the selected region based on the depth data associated with the selected region; and
   an audio enhancement module to enhance the audio component.

2. The mobile computing device of claim 1, wherein the three-dimensional image comprises a three-dimensional image from a three-dimensional video.

3. The mobile computing device of claim 1, wherein the microphone array comprises at least six beamforming microphone sub-arrays.

4. The mobile computing device of claim 3, wherein the microphone array is remote from, and communicatively coupled to, the mobile computing device.

5. The mobile computing device of claim 3, wherein the microphone array comprises:
   a first microphone array located on a rear side of the mobile computing device toward a first sidewall, wherein the first microphone array comprises a first microphone located centrally on the rear side, a second microphone located laterally of the first microphone toward a first end of the mobile computing device, and a third microphone located laterally of the first microphone toward a second end of the mobile computing device opposite the first end, and
   a second microphone array located on the rear side of the mobile computing device toward a second sidewall opposite the first sidewall, wherein the second microphone array comprises a fourth microphone located centrally on the rear side, a fifth microphone located laterally of the fourth microphone toward the first end of the mobile computing device, and a sixth microphone located laterally of the fourth microphone toward the second end of the mobile computing device.

6. The mobile computing device of claim 1, wherein the image region determination module is to determine the selected region based on a user-defined boundary defined on the three-dimensional image via the display.

7. The mobile computing device of claim 1, wherein to determine the selected region of the three-dimensional image comprises to determine at least one individual captured in the three-dimensional image based on a user selection.

8. One or more non-transitory, machine-readable storage media comprising a plurality of instructions stored thereon that, when executed, cause a mobile computing device to:
   receive a three-dimensional audio associated with a three-dimensional image from a microphone array;
   determine an orientation of the microphone array while the three-dimensional audio is captured;
   generate a mapping of the three-dimensional audio to the three-dimensional image based on the orientation of the microphone array;
   determine a selected region of the three-dimensional image based on a selection by a user of the mobile computing device;
   generate an audio component of the three-dimensional audio corresponding to the selected region based on depth data of the three-dimensional image associated with the selected region; and
   enhance the audio component.

9. The one or more non-transitory, machine-readable storage media of claim 8, wherein to receive the three-dimensional audio comprises to receive a three-dimensional audio associated with a three-dimensional video, wherein the three-dimensional video comprises the three-dimensional image.

10. The one or more non-transitory, machine-readable storage media of claim 8, wherein to receive the three-dimensional audio comprises to receive the three-dimensional audio from a microphone array remote from, and communicatively coupled to, the mobile computing device.

11. The one or more non-transitory, machine-readable storage media of claim 8, wherein to determine the selected region of the three-dimensional image comprises to determine the selected region of the three-dimensional image based on a boundary defined by the user on the three-dimensional image.

12. The one or more non-transitory, machine-readable storage media of claim 8, wherein to determine the selected region comprises to determine at least one individual captured in the three-dimensional image based on a selection of the user.

13. The one or more non-transitory, machine-readable storage media of claim 8, wherein to generate the audio component of the three-dimensional audio corresponding to the selected region comprises to generate the audio component based on a mapping of the three-dimensional audio to the three-dimensional image.

14. A method for localized audio enhancement of a three-dimensional image, the method comprising:
   receiving, by a mobile computing device, a three-dimensional audio associated with the three-dimensional image from a microphone array;
   determining, by the mobile computing device, an orientation of the microphone array while the three-dimensional audio is captured;
   generating, by the mobile computing device, a mapping of the three-dimensional audio to the three-dimensional image based on the orientation of the microphone array;

determining, by the mobile computing device, a selected region of a three-dimensional image based on a selection by a user of the mobile computing device;

generating, by the mobile computing device, an audio component of the three-dimensional audio corresponding to the selected region based on depth data of the three-dimensional image associated with the selected region; and enhancing, by the mobile computing device, the audio component.

15. The method of claim 14, wherein receiving the three-dimensional audio comprises receiving a three-dimensional audio associated with a three-dimensional video, wherein the three-dimensional video comprises the three-dimensional image.

16. The method of claim 14, wherein receiving the three-dimensional audio comprises receiving, by the mobile computing device, the three-dimensional audio from a microphone array remote from, and communicatively coupled to, the mobile computing device.

17. The method of claim 14, wherein determining the selected region of the three-dimensional image comprises determining, by the mobile computing device, the selected region of the three-dimensional image based on a boundary defined by the user on the three-dimensional image.

18. The method of claim 14, wherein determining the selected region comprises determining, by the mobile computing device, at least one individual captured in the three-dimensional image based on a selection of the user.

19. The method of claim 14, wherein generating the audio component of the three-dimensional audio corresponding to the selected region comprises generating the audio component based on a mapping of the three-dimensional audio to the three-dimensional image.

\* \* \* \* \*